United States Patent [19]

Garcia

[11] Patent Number: 5,731,692
[45] Date of Patent: Mar. 24, 1998

[54] SYSTEM AND METHOD FOR LIMITING OVERSHOOT IN A VOLTAGE AND CURRENT CONTROL CIRCUIT

[75] Inventor: Richard R. Garcia, Plano, Tex.

[73] Assignee: Lucent Technologies Inc., Murray Hill, N.J.

[21] Appl. No.: 723,742

[22] Filed: Sep. 30, 1996

[51] Int. Cl.$^6$ ...................................................... G05F 1/56
[52] U.S. Cl. .......................... 323/274; 323/280; 323/285
[58] Field of Search ............................... 363/98; 323/274, 323/275, 280, 284, 285

[56] References Cited

U.S. PATENT DOCUMENTS

| | | | |
|---|---|---|---|
| 4,012,685 | 3/1977 | Necessian | 307/53 |
| 4,166,983 | 9/1979 | Lacroix | 330/297 |
| 4,204,266 | 5/1980 | Kammiller et al. | 363/98 |
| 4,654,770 | 3/1987 | Santurtun | 363/17 |

*Primary Examiner*—Peter S. Wong
*Assistant Examiner*—Bao Q. Vu

[57] ABSTRACT

A control circuit for, and method of, alternately controlling one of at least two controllable characteristics of a controlled circuit. The circuit includes: (1) a first control subcircuit having a first error amplifier for developing a first control signal as a function of a first controllable characteristic of the controlled circuit, (2) a second control subcircuit for developing a second control signal as a function of a second controllable characteristic of the controlled circuit, (3) an OR circuit for selecting which of the first control signal and the second control signal is to control the controlled circuit and (4) an overshoot limiting circuit for establishing a feedback loop around the first error amplifier as a function of a voltage present in the OR circuit while the second control signal controls the controlled circuit, the feedback loop preventing a saturation of the first error amplifier and thereby reducing a slew rate time delay when the first control signal is selected to control the controlled circuit.

20 Claims, 3 Drawing Sheets

SYSTEM AND METHOD FOR LIMITING OVERSHOOT IN A VOLTAGE AND CURRENT CONTROL CIRCUIT

TECHNICAL FIELD OF THE INVENTION

The present invention is directed, in general, to power conversion and, more specifically, to a system and method for limiting overshoot in a voltage and current control circuit.

BACKGROUND OF THE INVENTION

Increased power density is a continuing goal of modern power supply design. High power density is particularly crucial in applications wherein the allocated space for the power supply relative to the power output is restricted. In addition to being highly compact, the power supply must also be efficient to limit heat-creating power dissipation. An illustrative application for a high density power supply is a power supply module employing a battery reserve system or battery plant in a central office of a telecommunications network.

A power supply module that provides power to a battery plant in a telecommunications network may employ a convection-cooled rectifier. Conventionally, the rectifier consists of two power stages including a power factor correction section and an isolated DC/DC converter. The rectifier should be designed to achieve low total harmonic distortion, high power factor and high efficiency. Any number of topologies may be employed in the two stages of the rectifier. For instance, a boost topology with lossless snubber circuit and a power factor enhancement circuit may be employed for the power factor correction section of the rectifier. A zero-voltage switching full-bridge phase-shifted topology may be employed for the isolated DC/DC converter.

As previously mentioned, one of the challenges in the design of a power supply, especially in a natural convection-cooled rectifier, is the thermal management therein. One solution to the thermal management challenge is to design a higher efficiency rectifier. Not only may the area of the silicon forming the power semiconductors of the rectifier be increased to reduce losses therethrough, but the components, power stages and control of the rectifier should be augmented to optimize the overall efficiency thereof. In conjunction therewith, the physical arrangement of the power dissipating components should be addressed to minimize the thermal cross coupling and maximize the convection cooling within the rectifier.

Another important factor in the design of high power density power supplies is the functional demands on the output of the device (e.g., rectifier). Moreover, the control scheme designated to regulate to rectifier should be flexible in nature to accommodate the fluctuations in the operation of the rectifier in an adequate period of time. For instance, when employed in a battery plant for a telecommunications system, the rectifiers regulate the plant voltage to a programmable constant value (i.e., a float value) when the batteries are fully charged. However, this value may vary depending on the battery characteristics and the surrounding environment (e.g., temperature). As a result, the rectifiers may be required to provide minimal current or full-load current during the float mode of operation.

In the event of a loss of primary power, the battery reserve system is employed to provide power to the telecommunications equipment. To maintain a state of readiness, the battery reserve system must be preserved in a fully-charged and operational condition at all times. Therefore, when the primary power is operational, the rectifiers are employed to simultaneously recharge the plant batteries and provide power to the system load. During the recharging process (i.e., when the battery voltage is less than the float value) the rectifiers function as a programmable regulated current source to control the recharging rate of the batteries. As the batteries in the plant approach a full charge, the rectifiers transition from regulating current to regulating voltage.

While the float and charge modes are the predominant modes of operation for the rectifier associated with a battery plant, the rectifier also endures other operating conditions. For instance, activating a rectifier when the power module is operating is essentially a no-load turn-on condition because the rectifier is incapable of providing source current to the load until its voltage output exceeds the voltage of the plant. Additionally, activating a rectifier in an installation without reserve battery units and without other non-active rectifiers coupled to the bus may provide a capacitive load from the other rectifiers on the bus. Also, the rectifier may also be subject to a short-circuiting condition. The rectifier is therefore subject to a wide range of operating conditions and should be capable of operating under any combination of rated output voltage (e.g., from zero to maximum rating) and output current (e.g., from zero to current limit).

Accordingly, what is first needed in the art is a recognition that electronic components (e.g., power components such as a rectifier) are subject to a wide range of real world operating conditions and that precise control of the components to react to the variations in those conditions promptly (i.e., without needless time delays) is necessary. Further, what is needed is a system and method for controlling the components by decreasing a slew rate time delay associated therewith and thereby smoothing transitions between or among separate control loops in a multiple loop controller, and especially for a battery plant rectifier.

SUMMARY OF THE INVENTION

To address the above-discussed deficiencies of the prior art, the present invention provides a control circuit for, and method of, alternately controlling one of at least two controllable characteristics of a controlled circuit. The circuit includes: (1) a first control subcircuit having a first error amplifier for developing a first control signal as a function of a first controllable characteristic of the controlled circuit, (2) a second control subcircuit for developing a second control signal as a function of a second controllable characteristic of the controlled circuit, (3) an OR circuit for selecting which of the first control signal and the second control signal is to control the controlled circuit and (4) an overshoot limiting circuit for establishing a feedback loop around the first error amplifier as a function of a voltage present in the OR circuit while the second control signal controls the controlled circuit, the feedback loop preventing a saturation of the first error amplifier and thereby reducing a slew rate time delay when the first control signal is selected to control the controlled circuit.

Thus, the present invention provides a saturation and slew rate control scheme that is useful for controlled circuits that vary widely in their output characteristics. For the purposes of the present invention, the overshoot limiting circuit closes a loop around a portion of the control circuit in response to a characteristic in the circuit. More specifically, the overshoot limiting circuit establishes a feedback loop around the first or second control subcircuit as a function of a voltage in the OR circuit. Of course, the control circuit may be modified such that the overshoot limiting circuit responds to other characteristics (e.g., a sensed current) and still be within the broad scope of the present invention.

In an alternative embodiment of the present invention, the first control subcircuit further has a first sense amplifier, coupled to the first error amplifier, for sensing the first controllable characteristic. In a related embodiment, the second control subcircuit further has a second sense amplifier, coupled to a second error amplifier, for sensing the second controllable characteristic. Those of skill in the art are familiar with sense amplifiers and their use in control circuits.

In an alternative embodiment of the present invention, the OR circuit is a diode OR circuit. Those of skill in the art are familiar with diode OR circuits and their use in multi-loop control circuits. Further, those of skill in the art are familiar with alternative selection circuits that can function to advantage with the present invention.

In an alternative embodiment of the present invention, the first characteristic is an output voltage of the controlled circuit. In a related embodiment, the second characteristic is a load current of the controlled circuit. The first or the second characteristics could be variations in voltage or current or changes in rates of variations of such voltage or current. The first or the second characteristics could be temperature, frequency, wavelength, variations thereof or changes in rates of variations thereof. Those of skill in the art are familiar with the various characteristics that may be desired to be controlled, depending upon the particular application.

The present invention further contemplates a complete battery plant rectifier, including: (1) a power input that receives input AC power, (2) at least one switch couplable to said power input for switching said input AC power, (3) a rectifier that rectifies the switched AC power to produce a DC power, (4) a filter that filters the DC power to produce an output DC power to charge a battery and (4) a rectifier control circuit that alternately controls one of an output voltage and a load current of the battery plant rectifier. The rectifier control circuit includes: (a) a voltage control subcircuit having a voltage sense amplifier for sensing the output voltage and a voltage error amplifier that develops a voltage control signal as a function of the output voltage, (b) a current control subcircuit having a current sense amplifier for sensing the load current and a current error amplifier that develops a current control signal as a function of the load current, (c) a diode OR circuit that selects which one of said voltage control signal and the current control signal is to control the battery plant rectifier, (d) a voltage control signal overshoot limiting circuit for establishing a feedback loop around the voltage error amplifier as a function of a voltage present in the diode OR circuit while the current control signal controls the battery plant rectifier and (e) a current control signal overshoot limiting circuit for establishing a feedback loop around the current error amplifier as a function of the voltage present in the diode OR circuit while the voltage control signal controls the battery plant rectifier, the feedback loops around the voltage and current error amplifiers preventing a saturation and thereby reducing a slew rate time delay when the diode OR circuit switches between the voltage control signal and the current control signal.

In this more specific embodiment, the first control subcircuit is termed a "voltage control subcircuit," being so directed to controlling the output voltage of the battery plant rectifier. Further, the second control subcircuit is termed a "current control subcircuit," being so directed to controlling the load current of the battery plant rectifier.

Alternatively, in this more specific embodiment of the present invention, the feedback loops around the voltage and current error amplifiers limit the voltage and current control signals to a diode forward bias voltage above the voltage present in the diode OR circuit. Typically, the diode forward bias voltage is about 0.6 volts, resulting in a nearly nonexistent slew rate time delay.

Alternatively, in this more specific embodiment of the present invention, the feedback loops around the voltage and current error amplifiers each include a differential amplifier having inputs coupled across a diode in the diode OR circuit. The differential amplifiers sense the voltage across the associated diode and establish the appropriate feedback loop as a function thereof.

Alternatively, in this more specific embodiment of the present invention, the diode OR circuit comprises diodes coupling outputs of the voltage and current error amplifiers to a control input of the rectifier.

Alternatively, in this more specific embodiment of the present invention, the voltage control signal overshoot limiting circuit is disabled while the voltage control signal controls the battery plant rectifier and the current control signal overshoot limiting circuit is disabled while the current control signal controls the battery plant rectifier. Disabling the limiting circuit when its associated control signal is selected and in control of the battery plant rectifier prevents the limiting circuit from substantially interfering with the operation of the associated control circuit.

Alternatively, in this more specific embodiment of the present invention, the battery plant rectifier further comprises a plurality of chargeable batteries coupled to the battery plant rectifier to receive the filtered output DC power. Those of skill in the art will readily perceive other useful environments and applications for the control circuit and battery plant rectifier of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
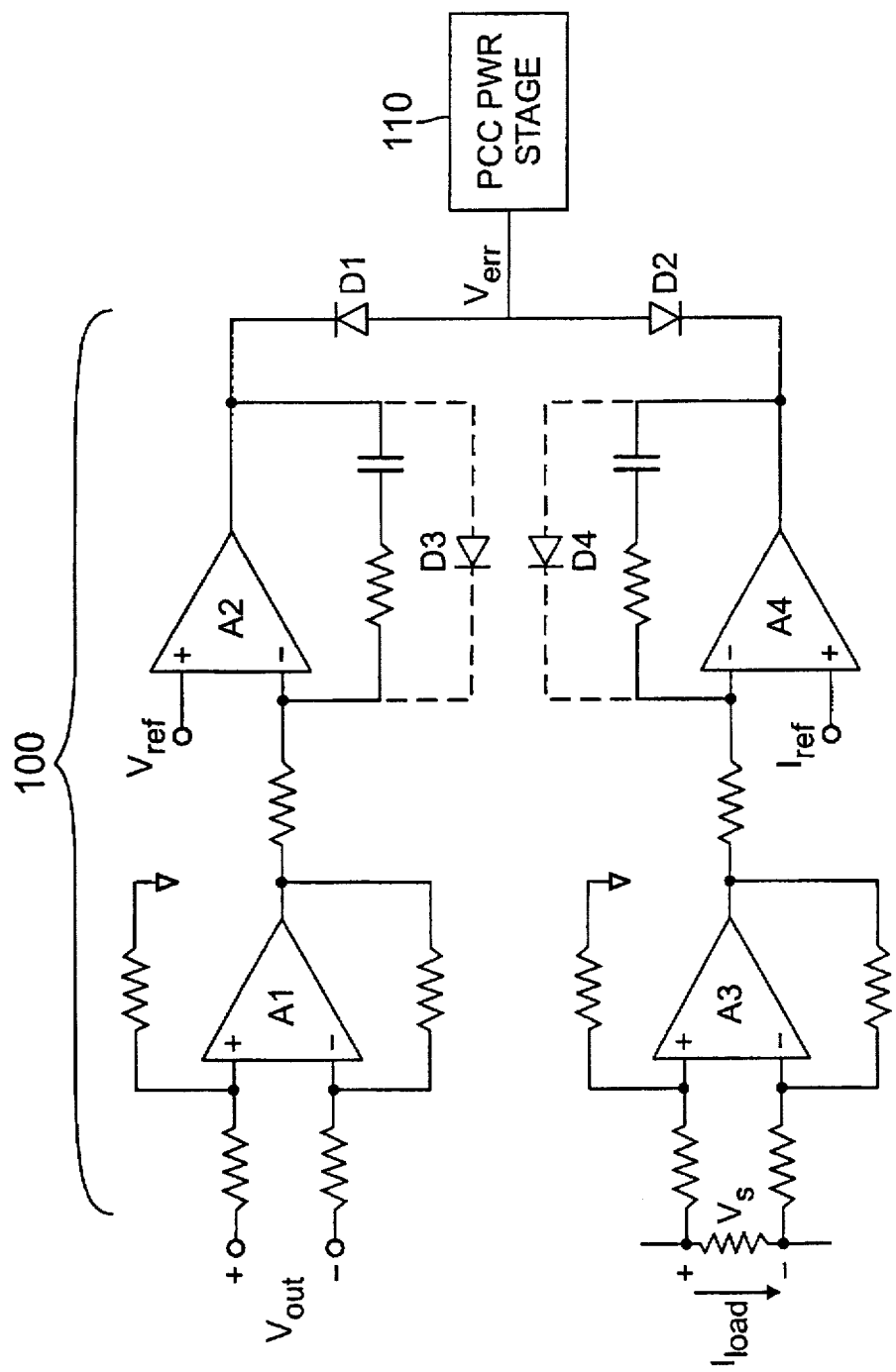
FIG. 1 illustrates a schematic diagram of a multiple loop controller having a prior art diode-based overshoot limiting circuit.

Referring initially to FIG. 1, illustrated is a schematic diagram of a multiple loop controller 100 having a prior art diode-based overshoot limiting circuit. The multiple loop controller 100 includes two similar sections. The first section, including a first amplifier A1 and a second amplifier A2, is an output voltage control circuit. The output voltage $V_{out}$ of a rectifier (not shown) provides an input signal to the first amplifier (e.g., a differential remote sense amplifier) A1. The output of first amplifier A1 feeds the second amplifier (e.g., a voltage error amplifier) A2. A reference voltage $V_{ref}$ is the output voltage reference. The second section of the multiple loop controller 100, including a third amplifier A3 and a fourth amplifier A4, embodies the output current control circuit. Analogous to the first section, an output current signal $V_s$ provides an input signal to the third amplifier (e.g., a differential current remote sense amplifier) A3. An output of third amplifier A3 feeds the fourth amplifier (e.g., a current error amplifier) A4. A reference current $I_{ref}$ is the output current reference voltage. The outputs of the second and fourth amplifiers A2, A4 are diode OR-ed with a first diode or second diode D1, D2, respectively, in such a manner that the amplifier (either the second or fourth amplifier A2, A4) with the lowest output voltage controls the peak current control ("PCC") power stage 110.

A limitation with the present control scheme is that the error amplifier (e.g., the fourth amplifier A4) that is not controlling the PCC power stage 110 tends to saturate towards the positive rail. As a result, when the inactive error amplifier (the fourth amplifier A4) seizes control of the control loop 100, its output voltage slews from the rail voltage to the control voltage level of the other error amplifier (e.g., the second amplifier A2). Depending on circuit parameters, the slew time delay can be as long as tens of milliseconds. Unfortunately, a circuit time delay, of even a few milliseconds, can be detrimental because of the excessive output currents or voltages resulting from rapid load transients (such as a short circuit or load dump). A different manifestation of this limitation occurs when a rectifier in a battery plant (not shown) is hovering at a threshold between output voltage control and output current control. A rectifier with a slow transitional time can oscillate as the two control loops alternately seize and lose control of the output.

A frequently employed solution to the aforementioned limitations is to couple a diode-based overshoot limiting circuit (including a first diode D3 and second diode D4 for the second amplifier A2 and fourth amplifier A4, respectively) in parallel with the feedback components of the second and fourth amplifier A2, A4 to clamp the output voltage to a level lower than the rail. For a power supply with a fixed output voltage and a fixed current limit, this may be an adequate solution, but for a rectifier with a wide range of output voltage control and an output current control, the prior art diode-based overshoot limiting circuit is not an adequate solution because of the large signal fluctuations for the error signals of the two loops.

Figure 2:
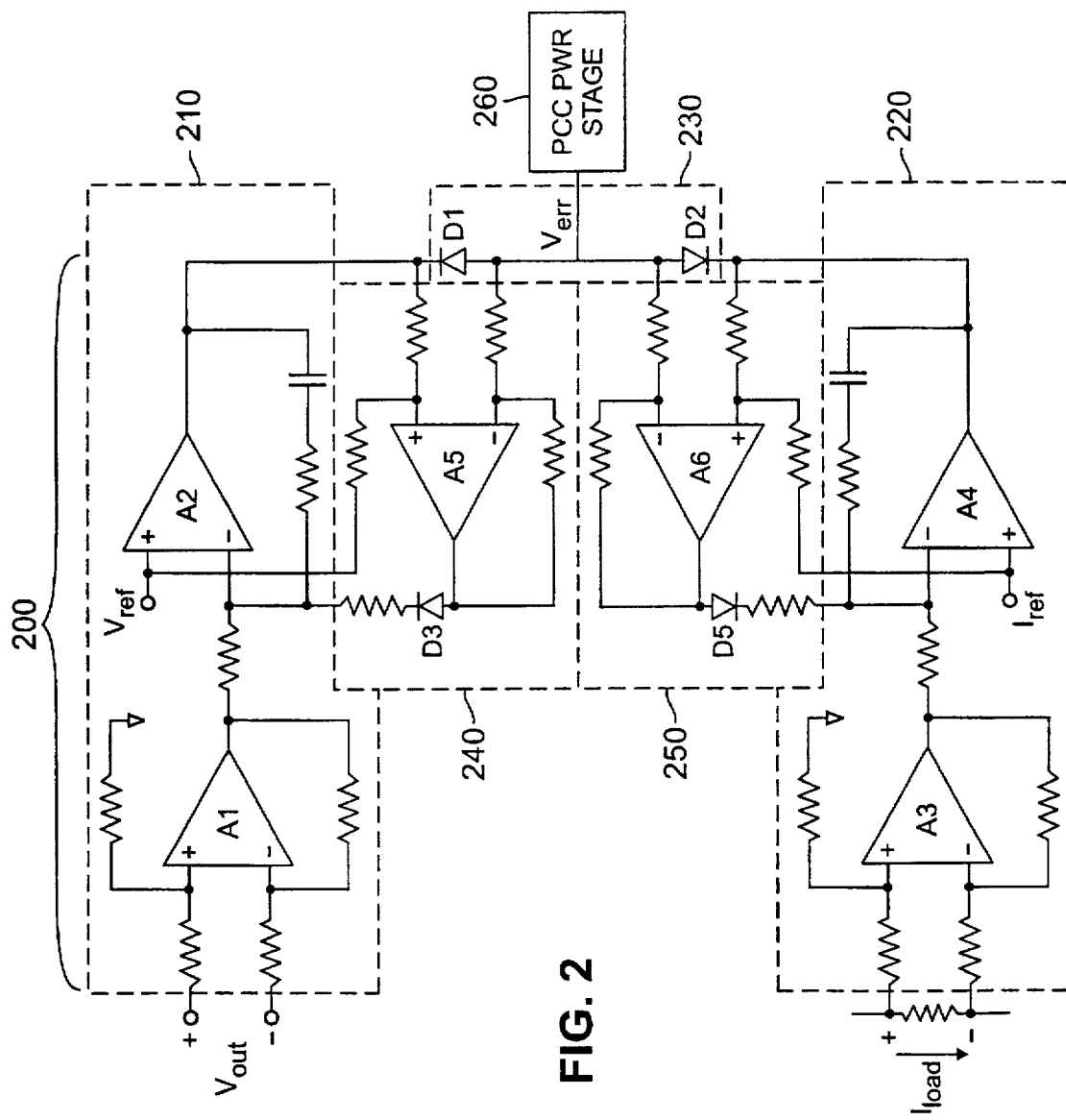
FIG. 2 illustrates a schematic diagram of a multiple loop controller including an embodiment of an overshoot limiting circuit according to the present invention.

Turning now to FIG. 2, illustrated is a schematic diagram of a multiple loop controller 200 including an embodiment of an overshoot limiting circuit according to the present invention. Analogous to the multiple loop controller 100 of FIG. 1, the multiple loop controller 200 includes an output voltage control circuit or first control subcircuit (including a first amplifier A1 and a second amplifier A2) 210 and an output current control circuit or second control subcircuit (including a third amplifier A3 and a fourth amplifier A4) 220. Referring to the output voltage control circuit 210, an output voltage $V_{out}$ of a rectifier (for instance) provides an input signal to the first amplifier (e.g., a differential remote sense amplifier) A1. The output of first amplifier A1 feeds the second amplifier (e.g., a voltage error amplifier) A2. A reference voltage $V_{ref}$ is the output voltage reference. Referring now to the output current control circuit 220, an output current signal $V_s$ provides an input signal to the third amplifier (e.g., a differential current remote sense amplifier) A3. An output of third amplifier A3 feeds the fourth amplifier (e.g., a current error amplifier) A4. A reference current $I_{ref}$ is the output current reference voltage. The outputs of the second and fourth amplifiers A2, A4 are diode OR-ed (a diode OR circuit 230) including a first diode or second diode D1, D2, respectively, in such a manner that the amplifier (either the second or fourth amplifier A2, A4) with the lowest output voltage controls a peak current control ("PCC") power stage 210. In contrast to the multiple loop controller 100 of FIG. 1, the multiple loop controller 200 includes overshoot limiting circuits 240, 250 establishing a feedback loop with first and second feedback loop amplifiers A5, A6 around the second and fourth amplifiers A2, A4, respectively.

Again, due to the OR-ing of the first and second diodes D1, D2, the amplifier (either the second or fourth amplifier A2, A4) with the lowest output voltage controls the PCC power stage 210. As a result, when the second amplifier A2 is controlling the output, the first diode D1 is conducting. Moreover, because the first feedback loop amplifier A5 is configured as a unity gain differential amplifier with its output referenced to the reference voltage $V_{ref}$, the output voltage of the first feedback loop amplifier A5 is approximately 0.6 volts negative with respect to the reference voltage $V_{ref}$ when the first diode D1 is conducting. As a result, a third diode D3 incurs a negative bias thereby effectively disconnecting the loop including the first feedback loop amplifier A5. In other words, when the second amplifier A2 is in control, the first feedback loop amplifier A5 has no effect.

When the output current control circuit is controlling, the output of second amplifier A2 tends to saturate towards the positive rail thereby reverse biasing the first diode D1. As the voltage on the cathode of first diode D1 increases, the output voltage of the first feedback loop amplifier A5 increases until the third diode D3 begins to conduct thereby closing the feedback loop of the first feedback loop amplifier A5 around the second amplifier A2. Due to the high DC gain from the cathode of third diode D3 to the output of second amplifier A2, the reverse bias voltage across the first diode D1 is approximately 0.6 volts DC leading to an output voltage of about 0.6 volts DC above the reference voltage $V_{ref}$. The differential voltage is then adequate to forward bias the third diode D3. As a result, the output of second amplifier A2 is about 0.6 volts DC more positive than the control voltage $V_{err}$ established by the output current control circuit 220. In an analogous manner, the output of the fourth amplifier A4 will be about 0.6 volts DC more positive than the control voltage $V_{err}$ when the output voltage control circuit 210 is in control. During the transition between control loops, the inactive amplifier (either the second or fourth amplifier A2, A4) has a much improved slew rate time delay because the inactive amplifier changes at about 0.6 volts or less to obtain control of the PCC power stage 210.

Figure 3:
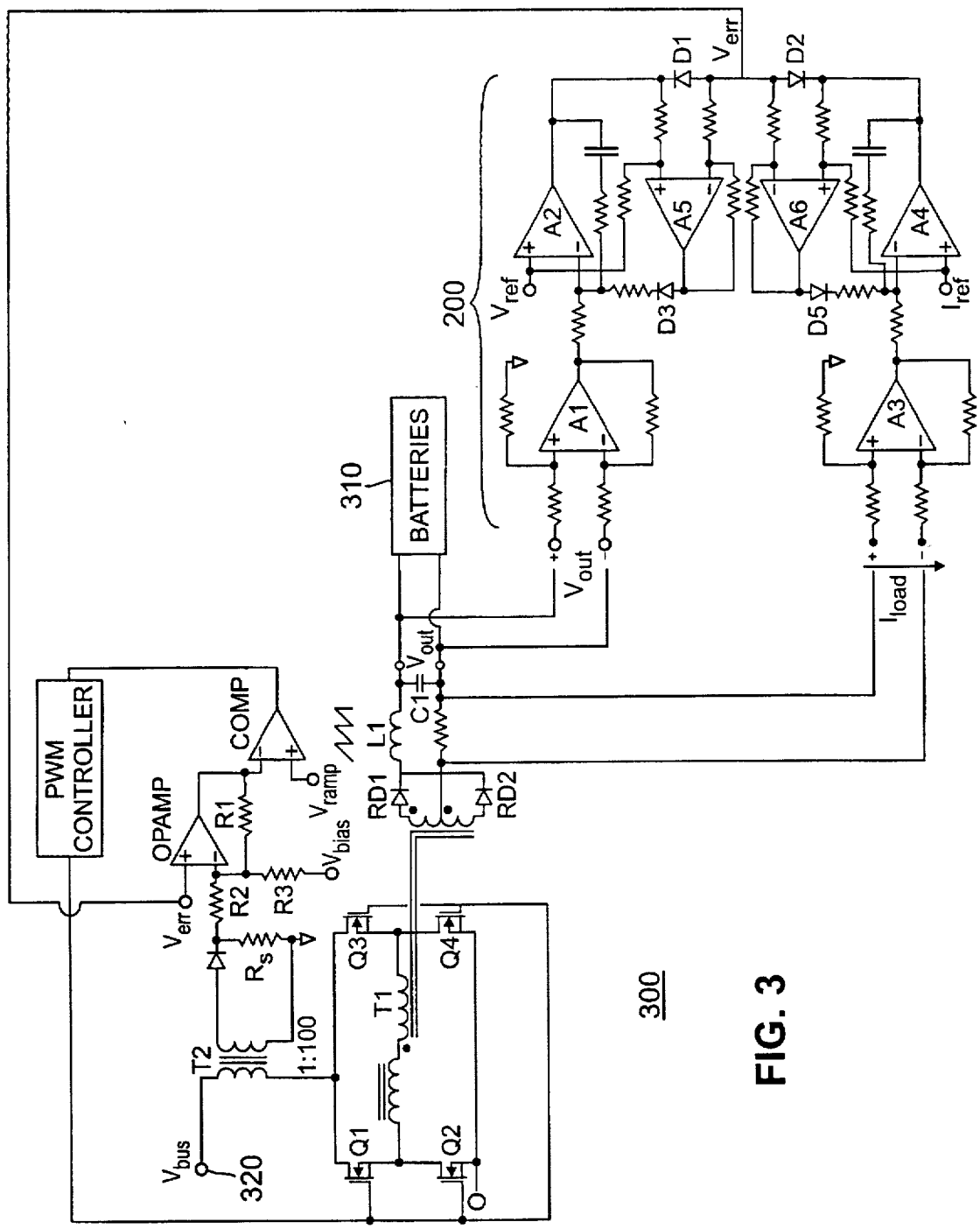
FIG. 3 illustrates a block diagram of a battery plant rectifier, including the multiple loop controller of FIG. 2, for providing charge power to one or more batteries.

Turning now to FIG. 3, illustrated is a block diagram of a battery plant rectifier 300, including the multiple loop controller 200 of FIG. 2, for providing charge power to one or more batteries 310. The battery plant rectifier 300 includes a power input 320 for receiving input AC power; at least one switch (including a plurality of switches Q1, Q2, Q3, Q4) coupled to the power input 320 for switching the input AC power; a rectifier (including a plurality of rectifying diodes RD1, RD2) that rectifies the switched AC power to produce a DC power; and a filter (including an inductor L1 and capacitor C1) that filters the DC power to produce an output DC power to charge the batteries 310. The battery plant rectifier 300 also includes a transformer T1 to, among other things, provide electrical isolation between the input and output thereof. The battery plant rectifier 300 further includes the multiple loop controller or rectifier control circuit 200 that alternately controls one of the output voltage $V_{out}$ and a load current $I_{load}$ of the battery plant rectifier 300.

With continuing reference to FIG. 2, the rectifier control circuit 200 includes the output voltage control circuit 210 having the voltage sense amplifier (the first amplifier A1) for sensing the output voltage $V_{out}$ and a voltage error amplifier (the second amplifier A2) that develops a voltage control signal as a function of the output voltage $V_{out}$. The rectifier control circuit 200 also includes the output current control circuit 220 having a current sense amplifier (the third amplifier A3) for sensing the load current $I_{load}$ and a current error amplifier (the fourth amplifier A4) that develops a current control signal as a function of the load current $I_{load}$. The rectifier control circuit 200 further includes the diode OR circuit (including the diodes D1, D2) 230 that selects which one of the voltage control signal and the current control signal is to control the battery plant rectifier 300. The rectifier control circuit 200 further includes a voltage control signal overshoot limiting circuit (including the first feedback loop amplifier A5) 240 for establishing a feedback loop around the voltage error amplifier A2 as a function of a voltage present in the diode OR circuit 230 while the current control signal controls the battery plant rectifier 300. The rectifier control circuit 300 still further includes a current control signal overshoot limiting circuit (including the second feedback loop amplifier A6) 250 for establishing a feedback loop around the current error amplifier A4 as a function of a voltage present in the diode OR circuit 230 while the voltage control signal controls the battery plant rectifier 300. In the present embodiment, the feedback loops around the voltage and current error amplifiers A2, A4 limit the voltage and current control signals to a diode voltage (e.g., 0.6 volts) above the control voltage $V_{err}$. The feedback loops around the voltage and current error amplifiers A2, A4 prevent a saturation thereof and thereby reduce a slew rate time delay when the diode OR circuit 230 switches between the voltage control signal and the current control signal.

Those skilled in the art should understand that while the present invention is embodied as hardware that other variations including software and firmware implementations are well within the broad scope of the present invention. Moreover, the present embodiment is introduced for illustrative purposes only and other applications subject to control by multiple control loops or schemes may benefit from and are well within the broad scope of the present invention. Furthermore, for a better understanding of control systems and architectures see *Modern Control Engineering* by Katsuhiko Ogata, Prentice Hall 1990 and for a better understanding of power electronics including power conversion technologies see *Principles of Power Electronics*, by J. G. Kassakian, M. F. Schlecht and G. C. Verghese, Addison-Wesley 1991. The aforementioned references are herein incorporated by reference.

Although the present invention has been described in detail, those skilled in the art should understand that they can make various changes, substitutions and alterations herein without departing from the spirit and scope of the invention in its broadest form.

What is claimed is:

1. A control circuit for alternately controlling one of at least two controllable characteristics of a controlled circuit, comprising:
    a first control subcircuit having a first error amplifier for developing a first control signal as a function of a first controllable characteristic of said controlled circuit;
    a second control subcircuit for developing a second control signal as a function of a second controllable characteristic of said controlled circuit;
    an OR circuit for selecting which of said first control signal and said second control signal is to control said controlled circuit; and
    an overshoot limiting circuit for establishing a feedback loop around said first error amplifier as a function of a voltage present in said OR circuit while said second control signal controls said controlled circuit, said feedback loop preventing a saturation of said first error amplifier and thereby reducing a slew rate time delay when said first control signal is selected to control said controlled circuit.

2. The circuit as recited in claim 1 wherein said first control subcircuit further has a first sense amplifier, coupled to said first error amplifier, for sensing said first controllable characteristic.

3. The circuit as recited in claim 1 wherein said second control subcircuit further has a second sense amplifier, coupled to a second error amplifier, for sensing said second controllable characteristic.

4. The circuit as recited in claim 1 wherein said controlled circuit is a battery plant rectifier.

5. The circuit as recited in claim 1 wherein said OR circuit is a diode OR circuit.

6. The circuit as recited in claim 1 wherein said first characteristic is an output voltage of said controlled circuit.

7. The circuit as recited in claim 1 wherein said second characteristic is a load current of said controlled circuit.

8. A method of alternately controlling one of at least two controllable characteristics of a controlled circuit, comprising the steps of:
    generating, in a first control subcircuit having a first error amplifier, a first control signal as a function of a first controllable characteristic of said controlled circuit;
    generating, in a second control subcircuit, a second control signal as a function of a second controllable characteristic of said controlled circuit;
    selecting, with an OR circuit, which of said first control signal and said second control signal is to control said controlled circuit; and
    establishing a feedback loop around said first error amplifier as a function of a voltage present in said OR circuit while said second control signal controls said controlled circuit, said feedback loop preventing a saturation of said first error amplifier and thereby reducing a slew rate time delay when said first control signal is selected to control said controlled circuit.

9. The method as recited in claim 8 wherein said first control subcircuit further has a first sense amplifier coupled to said first error amplifier, said step of generating said first control signal comprising the step of sensing said first controllable characteristic.

10. The method as recited in claim 8 wherein said second control subcircuit further has a second sense amplifier coupled to a second error amplifier, said step of generating said second control signal comprising the step of sensing said second controllable characteristic.

11. The method as recited in claim 8 wherein said controlled circuit is a battery plant rectifier.

12. The method as recited in claim 8 wherein said OR circuit is a diode OR circuit.

13. The method as recited in claim 8 wherein said first characteristic is an output voltage of said controlled circuit.

14. The method as recited in claim 8 wherein said second characteristic is a load current of said controlled circuit.

15. A battery plant rectifier, comprising:

a power input that receives input AC power;

at least one switch couplable to said power input for switching said input AC power;

a rectifier that rectifies said switched AC power to produce a DC power;

a filter that filters said DC power to produce an output DC power to charge a battery; and a rectifier control circuit that alternately controls one of an output voltage and a load current of said battery plant rectifier, said rectifier control circuit including:

a voltage control subcircuit having a voltage sense amplifier for sensing said output voltage and a voltage error amplifier that develops a voltage control signal as a function of said output voltage, a current control subcircuit having a current sense amplifier for sensing said load current and a current error amplifier that develops a current control signal as a function of said load current, a diode OR circuit that selects which one of said voltage control signal and said current control signal is to control said battery plant rectifier, a voltage control signal overshoot limiting circuit for establishing a feedback loop around said voltage error amplifier as a function of a voltage present in said diode OR circuit while said current control signal controls said battery plant rectifier, and a current control signal overshoot limiting circuit for establishing a feedback loop around said current error amplifier as a function of said voltage present in said diode OR circuit while said voltage control signal controls said battery plant rectifier, said feedback loops around said voltage and current error amplifiers preventing a saturation and thereby reducing a slew rate time delay when said diode OR circuit switches between said voltage control signal and said current control signal.

16. The battery plant rectifier as recited in claim 15 wherein said feedback loops around said voltage and current error amplifiers limit said voltage and current control signals to a diode forward bias voltage above said voltage present in said diode OR circuit.

17. The battery plant rectifier as recited in claim 15 wherein said feedback loops around said voltage and current error amplifiers each include a differential amplifier having inputs coupled across a diode in said diode OR circuit.

18. The battery plant rectifier as recited in claim 15 wherein said diode OR circuit comprises diodes coupling outputs of said voltage and current error amplifiers to a control input of said rectifier.

19. The battery plant rectifier as recited in claim 15 wherein said voltage control signal overshoot limiting circuit is disabled while said voltage control signal controls said battery plant rectifier and said current control signal overshoot limiting circuit is disabled while said current control signal controls said battery plant rectifier.

20. The battery plant rectifier as recited in claim 15 further comprising a plurality of chargeable batteries coupled to said battery plant rectifier to receive said output DC power.

* * * * *